United States Patent [19]

Klemm et al.

[11] 4,419,047
[45] Dec. 6, 1983

[54] METHOD OF OPERATION OF A PUMP-TURBINE BETWEEN PART-LOAD OPERATION AND REVERSE PUMPING OPERATION

[75] Inventors: Dieter Klemm; Peter Ulith, both of Heidenheim, Fed. Rep. of Germany

[73] Assignee: Voith GmbH, Heidenheim, Fed. Rep. of Germany

[21] Appl. No.: 388,519

[22] Filed: Jun. 15, 1982

Related U.S. Application Data

[62] Division of Ser. No. 162,584, Jun. 23, 1980, abandoned.

[30] Foreign Application Priority Data

Sep. 1, 1979 [DE] Fed. Rep. of Germany ....... 2935480

[51] Int. Cl.³ ............................................. F01D 17/00
[52] U.S. Cl. ..................................... 415/150; 415/164
[58] Field of Search .................... 415/1, 150, 160, 163, 415/164, 165, 500, 155

[56] References Cited

U.S. PATENT DOCUMENTS

| 3,007,675 | 11/1961 | Süss | 415/163 X |
| 3,275,293 | 9/1966 | Hosogai | 415/1 |
| 3,309,057 | 3/1967 | Tonooka | 415/1 |
| 4,073,594 | 2/1978 | Takagi et al. | 415/1 |

FOREIGN PATENT DOCUMENTS

| 1337456 | 8/1963 | France | 415/150 |
| 44-26511 | 11/1969 | Japan | 415/1 |

Primary Examiner—Stephen Marcus
Assistant Examiner—Joseph M. Pitko
Attorney, Agent, or Firm—Timothy R. Conrad

[57] ABSTRACT

The invention relates to a method of operation of a pump-turbine between part-load and reverse pumping operation in which the various operating conditions are produced by changing the position of the wicket gates in that some of the wicket gates are removed from the synchronous operation as provided by the mechanical gate ring operator and inserting a servo-motor between the wicket gate and the gate ring which functions to alter the connection between the selected wicket gates and the gate ring operator.

2 Claims, 4 Drawing Figures

4,419,047

METHOD OF OPERATION OF A PUMP-TURBINE BETWEEN PART-LOAD OPERATION AND REVERSE PUMPING OPERATION

This is a division of application Ser. No. 162,584, filed June 23, 1980, now abandoned.

BACKGROUND OF THE INVENTION

It is known that in the operation of pump-turbines, in a turbine mode, the pump-turbines are started, in the manner of any reaction turbine, by simultaneously opening the wicket gates. This causes the pump-turbine runner to accelerate from a stationary position to rated revolutions per minute. When the wicket gates are positioned at an idle running position for obtaining an idle running operation of the pump-turbine, the motor-generator can be synchronized and connected to the associated electric grid system. Upon further movement of the wicket gates toward an open position, the pump-turbine will operate as a turbine and will furnish power. The characteristic curve of pump-turbines become steeper and steeper with an increasing $n_1$ in the $n_1-Q_1$ diagram (unit number of revolutions over unit flow). The characteristic curves may even become vertical or have a negative direction. This means that the characteristic performance of the pump-turbine in this range may be erratic.

A cutout of the four quadrant characteristic curve diagram of a given pump-turbine is shown in FIG. 1. As there shown, the curves for various wicket gate openings are identified as $a_1$ through $a_5$ where the largest wicket gate opening $a_5$ is used for synchronization. The L-curve in FIG. 1 is the idle running operation curve for turbine operation with a movement of $M=O$. Below idle running curve L in area B, FIG. 1 depicts the so-called braking operation of a pump-turbine and indicates that the runner keeps absorbing power and that the flow is in turbine operation direction and is operating as a brake-up to the point when the flow of the turbine becomes zero. Further, below the abscissa the pump-turbine enters into a pumping operation in turbine rotation direction, i.e., it enters in what is called a reverse pumping operation. The water will be delivered in the pump flow direction in spite of the fact that the pump-turbine is running in a turbine rotational direction.

In braking and in reverse turbine operation the curves, as shown in FIG. 1, depict an S-shape configuration; this condition causes undesirable effects such as the instability of operation of the pump-turbine. The result of this type of instability of operation is that synchronization in turbine mode operation is extremely difficult. Also, running idle for an extended period of time is impossible. The reason for this is that the smallest unavoidable pressure variations may cause sudden irregularities at a point when a load is taken on. In the transition period from synchronous operation in the direction of rotation in turbine mode, the following takes place: (a) the runner operates in air in preparation to operation in the turbine mode; (b) when the turbine is filled with water and the valve is opened, the temporary increase in power becomes undesirably large when the wicket gates are opened; (c) upon a further increase in the openings between the wicket gates a suddenly large power surge will be experienced when the pump-turbine starts to operate as a turbine.

SUMMARY OF THE INVENTION

It is an object of the present invention to provide an improvement in a pump-turbine and a method for its operation in which the operational characteristic curves are improved and indicate that starting shows stable characteristics in that for each value of a curve in the $n_1-Q_1$ diagram only one single $Q_1$ value exists.

The novel method which this invention presents solves the erratic performance problem by having at least one wicket gate temporarily separate from the operating mechanism and opened prior to the opening of the remaining wicket gates. The wicket gates are either mechanically connected through the gate ring to the gate operating mechanism or are operated individually by means of servo-motors which are designed to move the gates in synchronism. The invention provides a method wherein one or more of the wicket gates are separate from the gate operating mechanism which causes them to open in advance of the opening of the remaining gates. This results in altering the configuration of the characteristic curves. When a few gates have a larger opening than the remaining gates which are mechanically connected to each other for synchronized operation, a small opening between the synchronized gates will be adequate to produce the same flow and the same rotational speed as that which would be produced by the synchronous opening movement of all the wicket gates. This is true because small gate openings always produce stable performance curves. To achieve the improved performance curves, mechanism is provided which opens individual gates prior to the majority of the gates being opened in synchronism by the mechanical operator.

A further object of the present invention is to provide means wherein if more than one gate is to be removed from the synchronous operation by the mechanical operator, the gates removed from synchronous operation will be opposite with respect to each other.

The method herein disclosed makes it possible to synchronize and connect the pump-turbine to an associated electrical grid with the pump-turbine being in a completely stable condition for idle running and for part-load operation. The danger of the pump-turbine operating as a reverse pump is reduced to a minimum or eliminated.

A further advantage of the present invention is that the transition of operation from a pump-turbine mode to a turbine mode of operation can be accomplished with a minimized power intake surge which would normally occur.

Still another object of this invention is to provide a pump-turbine having wicket gates that are adjusted by a gate ring with a means for removing some of the gates from the synchronous connection between the gate ring and gates and inserting a servo-motor between gates that have been disconnected and the gate ring.

An advantageous relationship as taught by the present invention for a pump-turbine is in extending the gate lever of the gates which have been disconnected from the mechanically rigid connection between gate and gate ring and also having the length of the lever adjustable.

A still further advantage of the present invention is in having the gate ring operate a lever which is constructed and arranged to rotate freely about the gate stem or post. This lever is connected to a separately controlled hydraulic servo-motor which also operates a gate lever that is rigidly connected to the gate stem or post.

A pump-turbine having individual gate operating servo-motors has an advantage of being equipped for including an extra pre-opening gate movement arrangement in conjunction to the regular gate opening function, which extra gate pre-opening function can be utilized for the purpose of producing an additional amount of gate opening to the normal synchronous gate opening function.

DESCRIPTION OF THE INVENTION

Figure 1:
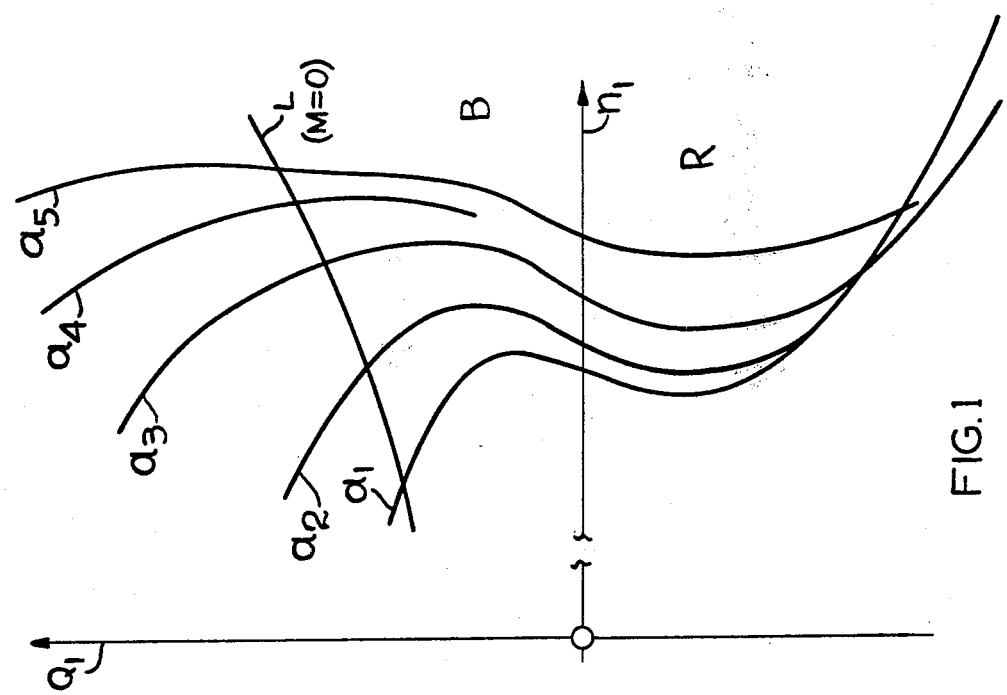
FIG. 1 is a portion of the four quadrant characteristic curve range of a pump-turbine showing the state of the art as it is known at the present time.

FIG. 1 illustrates characteristic curves of a pump-turbine when all of the wicket gates are controlled in a synchronous operation. In contrast FIG. 2 illustrates model tests characteristic curves of a pump-turbine in which several of the wicket gates are opened in advance of the majority of the wicket gates.

Figure 2:
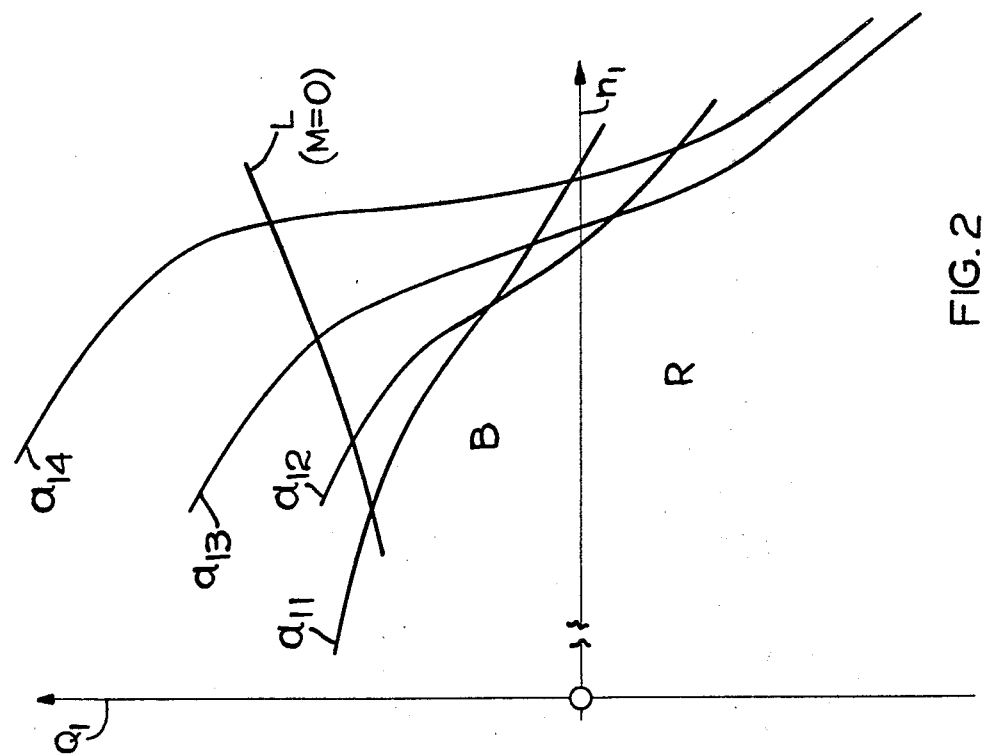
FIG. 2 is a portion of the four quadrant characteristic curve range similar to FIG. 1, but showing the curve range of a pump-turbine of the present invention.

As depicted by the curves $A_{11}$ through $A_{14}$, FIG. 2, it is evident that these curves show a completely stable operating condition of a pump-turbine. For each value of $A_{11}$, along the abscissa of the characteristic curve in FIG. 2, there is only one $Q_1$ value that exists. This is in contrast to characteristic curves of known pump-turbines which are illustrated by the curves in FIG. 1.

Figure 3:
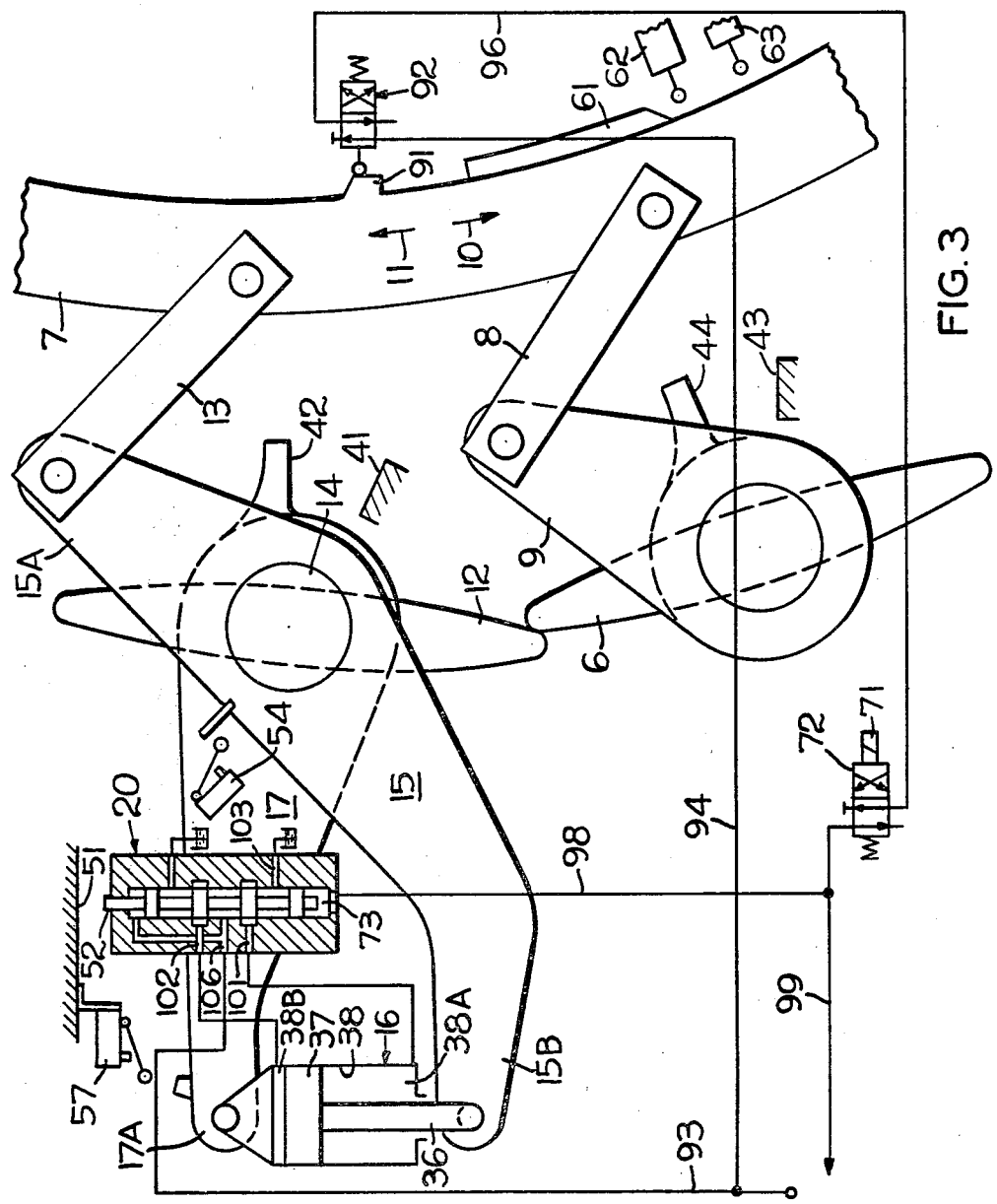
FIG. 3 is a schematic illustration of a pump-turbine operating gate ring with several associated wicket gates in which the present invention is incorporated.

In FIG. 3 there is shown two wicket gates, 6 and 12, which are operated by a gate ring 7. Gate 6 is representative of all gates to be operated in sychronism by gate ring 7. On the otherhand, gate 12 is representative of all gates to be removed from sychronous operation. The wicket gate 6 is connected to the gate ring 7 through a pivotal connected link 8 which, in turn, is pivotally connected to the end of gate lever 9 which, in turn, is operatively secured to the shaft or stub of the wicket gate 6. Rotational movement of the gate ring 7 in the direction indicated by the directional arrow 10 will effect movement of the wicket gate 6 to an open position. On the other hand, rotation of the gate ring 7 in a rotational direction as indicated by the directional arrow 11 will serve to move the wicket gate 6 from an open position to a closed position.

Wicket gate 12 is connected to be operated in synchronism with gate 6. To this end a link 13 has one end thereof pivotally connected to the gate ring 7 and has its opposite end pivotally connected to one extending arm 15A of a double arm lever 15. The lever 15 is mounted on the stem 14 of the wicket gate 12 in a manner so as to be freely rotatable on the stem 14. The opposite arm 15B of the lever 15 is operatively connected to the extending end of a piston rod 36 of a servo-motor 16, which includes a piston 37 to which the rod 36 is secured. The piston 37 operates within a cylinder 38 which is connected to the extending end 17A of a wicket gate lever 17 that is associated with the wicket gate 12.

Gate lever 17 is rigidly connected to the stem 14 of gate 12 so as to effect its movement whenever the end 17A of the lever is moved. Assuming that the piston 37 of the servo-motor 16 is maintained in the position shown relative to the cylinder, the end 17A of link 17 will be connected to move with the arm 15 through the servo-motor 16. Thus, the angular position of gate 12 will only correspond to that of lever 15 when the servo-motor piston assembly 36–37 is in its shortest position (i.e., pressure in chamber 38A). However, gate 12 can be opened an additional amount corresponding to the change in angle between lever 17 and lever 15 when the servo-motor piston assembly 36–37 moves from the shortest position, depicted in FIG. 3, to the longest position, that is, with the piston 37 moved to full bottom position in the cylinder. The movement of the piston 37 to its lowest position will cause the gate 12 to be opened an additional amount, for example, an additional 23° from the 4° position of gate 6 as effected by the initial movement of the ring 7. This opening gives a required change in machine characteristics as indicated by FIGS. 1 and 2. Thus, gate 6 will be at 4° open and gate 12 will be at 27° open and the remaining gates (not shown) connected to the ring 7, as exemplified by the gate 6 arrangement, will also be at 4° open positions. In this particular arrangement, the particular gate openings gave the necessary flow to spin the turbine at synchronous speed.

After synchronization of the turbine to output the correct line frequency has been achieved, the wicket gates can move to a further open position which will be assumed to be a maximum of 33° open to output more power. In this respect, the majority of the gates represented by gate 6 will open an additional 6°, that is be moved to 10° open position, which is their full open position. With gate 6 moved the additional 6°, gates 12 will also be moved the additional 6° to a full open position of 33°. This is true because gates 12 have been moved initially 4° open, then an additional 23° to 27° open (4°+23°). Thus, the additional 6° of movement moves gates 12, to 33° full open position, while gates 6 are at 10° full open.

Since 33° full open is the selected maximum gate opening, none of the gates are allowed to open more than the selected maximum. To this end, a positive stop 41 will be engaged by a stop lug 42 on the arm 17. The positive stop 41 permits a 1° over opening, that is gates 12 could open to 34°. Gates 6 also have a mechanical stop 43 which will be engaged by a stop lug 44. Thus, should failure in the hydraulic or electrical system occur, the mechanical positive stops 41–43 take over to protect the system.

Another protection arrangement is provided in the form of a positive stop 51 which can be located on the head cover (not shown). The stop 51 is set at maximum gate opening. Since a control valve 20 is carried by the lever 17, the extending end 52 of the spool will contact the stop 51 at a point before lever 17, and thus gates 12, reach their maximum opening of 33°. This action causes the spool to be pushed downwardly at maximum gate some point before lever 17 reaches the opening of 33°. Then as lever 17 continues to move toward maximum gate open position the spool will be positioned to bleed hydraulic fluid from chamber 38B of the servo-motor 16 and pressurize chamber 38A. This will effect the closing movement of the preopened gates to the same opening as all other gates.

The normal control of gate opening is controlled by a limit switch 54 which is tripped when the relative angle between levers 15 and 17 reach 23°. Another limit switch 57 is provided and will be actuated whenever the lever arm 17 has moved the associated gate 12 to 33° open position. The effect of switch 57 will cause a slow bleed from the pressurized side of the piston assembly 20. The provision of limit switch 57 duplicates the operation of stop 51 and provides additional protection should such be necessary.

Gate ring 7 is provided with an abutment 61 which operates to trip switches 62 and 63. Switch 62 will be tripped when the gate ring 7 is shifted to a position which would give a gate opening on gates 6 of 40% of maximum (about 12°). Switch 63 when tripped by the shift of the gate ring 7, will give a gate opening of 50% of maximum which is about (15°).

Switch 63 when actuated by the engagement of abutment 61 is arranged to put out a signal which causes gate 12 to resynchronize with gate 6 above 15° opening. This is done by a signal which deenergizes solenoid 71 of valve 72 causing the valve spool to be repositioned so as to vent chamber 73 of valve 20. This allows the valve spool 52 to move back to it's original position that it occupies as depicted in FIG. 3. Repositioning of the valve spool 52 will effect the pressurizing of chamber 38A and will vent chamber 38B of the servo-motor 16. This will shorten the piston assembly moving gate 12 back in synchronization with gate 6.

Switch 62 does the reverse of switch 63. When the gate ring 7 is moved in a closing direction and reaches a position of 12° gate open switch 62 will be activated moving gate 12 back out of synchronization with gate 6. This allows gate 12 to be as much as 23° further open than gate 6 but not further than 33°.

Figure 4:
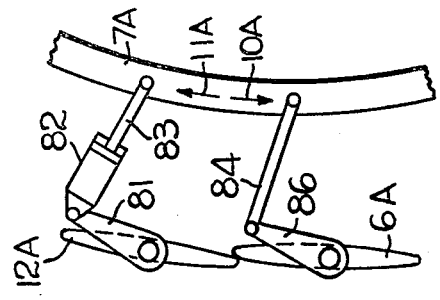
FIG. 4 is a schematic showing of a modification of the wicket gate operating arrangement.

A modification is shown in FIG. 4, wherein the gate 12A, which corresponds to gate 12 in FIG. 3, is depicted. Gate 12A is operated by lever arm 81 which, in turn, is secured to a lug on the one end of cylinder 82. The extending end of the piston rod 83 is operatively connected to a gate operating ring 7A. Thus, movement of the operating ring 7A in either direction will move gate 12A. Gate 6A is connected to lever 84 which, in turn, is pivotally connected to operating lever 86. The free-end of lever 84 is operatively connected to ring 7A operating ring. Lever 84 is substantially the same length as the extended rod 83 and associated cylinder 82. Thus initial movement of ring 7A in a gate opening direction, indicated by directional arrow 10A, will move gates 6A and 12A to a 4° open position. By shortening the connection between the end of lever 81 and the operating ring 7A, the gate 12A can be moved an additional 23° or to a 27° open position while gate 6A is maintained at 4° open position. Further movement of ring 7A in an opening direction will cause gates 6A and 12A to be moved an additional amount of 6°, so that gate 6A will be at 10° open position and gate 12A will be at 33° open maximum position.

The hydraulic control system shown in FIG. 3, is operable to provide the preopening movement of gate 12 and other gates, if so described. To this end in the initial opening movement of gate ring 7 in the direction of arrow 10 moving all the gates to 4° open position. An abutment 91 attached to ring 7 moves out of engagement with the actuating plunger of a control valve 92. The internal valve spool of valve 92 will be biased into a position to permit the flow of fluid under pressure from the pressurized line 93 through a connecting line 94 into a line 96. Line 96 communicates between valve 92 and valve 72. Thus, at a time that it is desired that gate 12 (or other like gates) preopen a signal will be received to energize solenoid 71 of valve 72. Valve 72 will then be conditioned to connect line 96 to a line 98 via a line 99. Line 99 may also be connected to one or more other valves similar to valve 20. Fluid under pressure will enter chamber 73 biasing the valve spool 52 upwardly uncovering ports 101 and 102. In uncovering port 101 the chamber 38A will be vented through the valve via port 101 and a tank port 103. At the same time chamber 38B will be supplied with fluid under pressure via pressure line 93, port 102 and a port 106. This will cause the servo-motor to extend causing movement of gate 12 the additional 23° from that of gate 6. This will cause synchronization of the machine to output to the correct line frequency. After this all of the gates will continue to open by operation of ring 7 to a maximum of 33° open to output more power, as previously described.

The embodiments of an invention in which an exclusive property or privilege is claimed are defined as follows:

1. In a pump-turbine having impeller means and a plurality of water flow control gates arranged in circular array around the impeller;
   a movable gate operating ring;
   connecting means operably connecting said gates to said operating ring for effecting the synchronized movement of said gates in opening and closing movements; and,
   a first means operably connected to effect the independent movement of at least one of said gates relative to a position that said gate operating ring moves said gate into;
   control means for selectively controlling the operation of said first means;
   wherein said connecting means for connecting said gate to said operating ring includes a first lever having one end secured to one of said gates, for effecting its movement;
   a second lever having a first end connected to said operating ring and having its second end connectible to the free end of said first lever;
   an adjustable connection to connect the free end of said first lever with the second end of said second lever to thereby have said first lever and said second lever move in unison through the operation of said operating ring; and,
   means to effect an adjustment in said adjustable connection to move said first lever relative to said second lever to thereby cause said gate to move an additional amount relative to the position that it is moved to by said operating ring.

2. A pump-turbine according to claim 1 wherein said first lever has its one end secured to said gate to effect its rotation about its axis;
   said second lever being supported on said gate intermediate its end for pivotal movement about the axis of said gate;
   said adjustable connection being a piston and cylinder servo-motor wherein the extending end of the piston is operably connected to the second end of said second lever and the cylinder has its free end connected to the opposite end of said first lever;
   a source of fluid under pressure for said servo-motor; and, control means operably connected to direct the fluid under pressure to a first end of said cylinder locking said first and second levers together for movement together upon operation of said operating ring, said control means being selectively operable to direct the fluid under pressure to the second end of said cylinder for effecting the movement of said first lever relative to the position of said second lever and thereby move said gate an additional amount relative to its position as effected by said operating ring.

* * * * *